Figure 1:
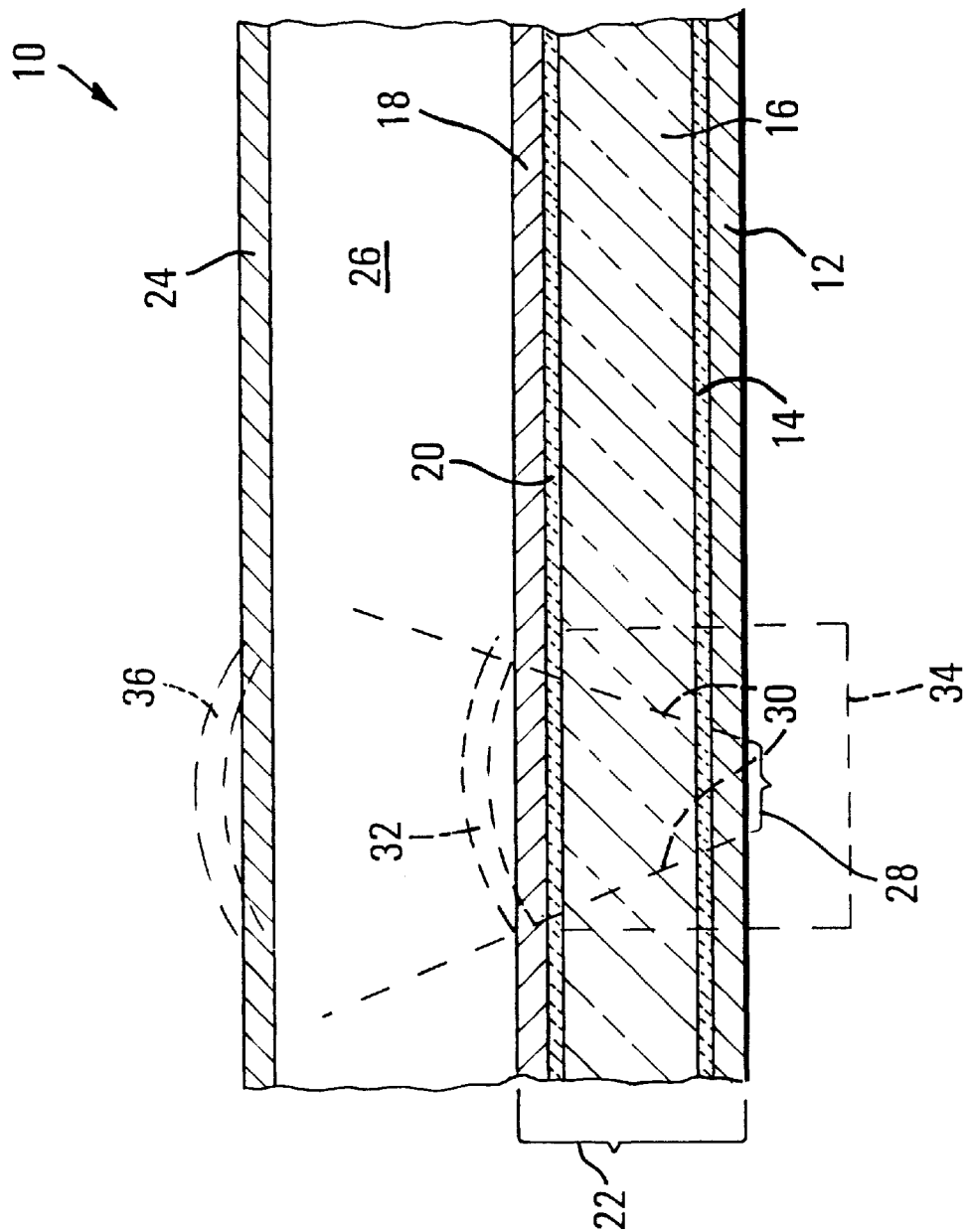

United States Patent [19]
Joynt

[11] Patent Number: 5,905,225
[45] Date of Patent: May 18, 1999

[54] ARMOURING

[75] Inventor: Vernon Peregrin Joynt, Pretoria, South Africa

[73] Assignee: Denel (Proprietary) Ltd., Pretoria, South Africa

[21] Appl. No.: 08/734,949

[22] Filed: Oct. 23, 1996

[30] Foreign Application Priority Data

Oct. 25, 1995 [ZA] South Africa ........................ 95/9043

[51] Int. Cl.⁶ ........................ F41H 5/013; F41H 5/04
[52] U.S. Cl. ................ 89/36.02; 89/36.08; 89/36.11; 89/36.12
[58] Field of Search ................ 89/36.02, 36.07, 89/36.08, 36.09, 36.11, 36.12; 428/911; 109/49.5

[56] References Cited

U.S. PATENT DOCUMENTS

| | | | |
|---|---|---|---|
| 3,705,558 | 12/1972 | McDougal et al. | 109/84 |
| 4,036,104 | 7/1977 | Pagano et al. | 89/36.08 |
| 4,049,864 | 9/1977 | Hoover et al. | 428/911 |
| 4,061,815 | 12/1977 | Poole, Jr. | 428/215 |
| 5,033,357 | 7/1991 | Seksaria et al. | 89/36.04 |
| 5,070,764 | 12/1991 | Shevach et al. | 89/36.08 |
| 5,131,314 | 7/1992 | Hansen et al. | 89/36.02 |
| 5,517,894 | 5/1996 | Bohne et al. | 89/36.02 |
| 5,533,781 | 7/1996 | Williams | 89/36.08 |

FOREIGN PATENT DOCUMENTS

| | | | |
|---|---|---|---|
| 0150639 | 8/1985 | European Pat. Off. | |
| 0287918 | 10/1988 | European Pat. Off. | |
| 2632393 | 12/1989 | France | |
| 2712078 | 5/1995 | France | |
| 363437 | 11/1922 | Germany | 89/36.02 |
| 3507216 | 9/1986 | Germany | |
| 4222398 | 8/1992 | Japan | 89/36.02 |
| 9830 | of 1901 | United Kingdom | 89/36.02 |
| 1151441 | 5/1969 | United Kingdom | |
| 1216538 | 12/1970 | United Kingdom | |
| 1352418 | 5/1974 | United Kingdom | |
| 2149482 | 6/1985 | United Kingdom | |
| 2280252 | 1/1995 | United Kingdom | 89/36.08 |
| 9107632 | 5/1991 | WIPO | |

Primary Examiner—Stephen M. Johnson
Attorney, Agent, or Firm—James Ray & Assocs.

[57] ABSTRACT

An up-armouring kit is suitable for use in protecting a protected zone behind a base 24 against a self forming fragment type landmine. The up-armouring kit comprises an outer wear plate 12, which is advantageously of armour plating of a composition and thickness suitable to prevent penetration by small arm bullets including light machine gun bullets; an inner catch plate 18 of a material having a ductility of at least about 8%; and an intermediate impact absorbing layer 16 of a material selected from the group consisting of a ceramic material, a refractory material, a glass based material and glass. The wear plate, the impact absorbing layer and the catch plate are bonded together in that order to form a sandwich construction (22).

12 Claims, 2 Drawing Sheets

ARMOURING

This invention relates to armouring. It relates more specifically to an up-armouring kit, and to an armour wall.

In accordance with a first aspect of this invention, there is provided an up-armouring kit suitable for use in protecting a protected zone behind a base against a self forming fragment type landmine (also known in the field of the invention as a slug type landmine), the up-armouring kit comprising an outer wear plate;
an inner catch plate of a material having a ductility of at least about 8%;
an intermediate impact absorbing layer of a material selected from the group consisting of a ceramic material, a refractory material, a glass based material and glass; the wear plate, the impact absorbing layer and the catch plate being bonded together in said order to form a sandwich construction.

The impact absorbing layer is of a hard, brittle, generally non-metal material and may comprise a silica-alumina mineral, aluminium oxide, a composite material including a fibrous component such as a metallic oxide matrix and carbon or glass fibres or metal oxide whiskers or other fibrous material. A composite material may include limited amounts of metallic components. Therefore the term "generally non-metal material" must be interpreted accordingly, i.e. to allow for limited amounts of metallic material to be included.

An up-armouring kit in accordance with the invention is expected to be applied to land vehicles in particular, but also to ships, aeroplanes and other structures.

The invention is expected to find commercial application with the deployment of peace keeping corps, in the operations of police and other civil agencies for the maintenance of law and order, by contractors who are contracted for the clearing of minefields and in many similar and analogous applications. An important application of the invention, for example, is in the protection of vehicles against landmines.

Early landmine designs used a charge of explosive material in an oblate spherical container of drawn sheet metal of a thinness that resulted in the main destructive effect of the mine being the blast resulting from explosion of the charge. The container disintegrated in the blast but the disintegrated sheet metal of the container was not a significant component of the destructive power of the blast.

New designs of landmines (also referred to as self forming fragment mines) are characterized by a dish shaped plate on the upper surface of the landmine. The dish shaped plate has a high melting point and is of highly cohesive metal of substantial thickness. The remaining body enclosing the explosive charge is generally of thin sheet metal similar to the prior design.

The dish shaped plate is deformed in an extraordinary manner by the blast when such a mine is set off and the plate becomes a projectile of high penetrating power. The effect is similar to that of projectiles of other military weapons such as the RPG 7 rocket launcher. The result is that armouring for vehicles that was previously effective, is no longer effective and does not adequately protect personnel in the vehicle against such a mine. Even increasing the thickness of conventional armour has been found ineffective, bearing in mind that in view of the resulting weight, there are upper limits to the thickness of conventional armour that can be used.

A primary characteristic of the blast absorbing layer, is the capacity to absorb large amounts of energy upon impact of a projectile at a very high velocity, for example at a velocity approaching velocity of wave front propagation of a blast resulting from discharge of high explosive. Examples are trinitrotoluene (TNT), nitro-glycerine and cellulose nitrate in a base of potassium or sodium nitrate (GELIGNITE), nitro-glycerine based explosives (DYNAMITE) and other high power explosives. Blast velocity (VOD) of such explosives is very high indeed so that conventional armour plating is penetrated by a projectile moving at near blast velocity up to a depth that make it impractical to provide on a landmine-proof vehicle.

Preferably, the outer wear plate may be in the form of armour plating of a composition and thickness suitable to prevent penetration by small arm bullets including light machine gun bullets. It may have a hardness of between about 400 and about 550 Brinell, and it may have a thickness of about 4 mm for armouring weighing 32 kg/m$^2$.

Thus, the outer wear plate, which is first exposed to the blast, combines strength and hardness with a degree of ductility. Such steels are well adapted to resist disintegration under shock loading as occurs when subjected to a projectile moving at high speed and blast.

It is important that the outer wear plate is small arm bullet-proof, including proof against light machine gun bullets and even against hand grenades and the like. This will keep the sandwich construction intact, and will obviate having to replace the up-armouring kit after having been hit by small arm fire, and the like.

The steel layer or plate of the protected side, i.e. the inner catch plate, preferably has high toughness properties with somewhat higher ductility than the outer wear plate.

The bonding together of the wear plate, the impact absorbing layer and the catch plate may be by means of a synthetic resinous adhesive compound. The bonding may be carried out using setting resins such as urethane, epoxy compositions and other known high strength adhesives that are effective between the kind of impact absorbing material mentioned and a metallic material. The technique of sand blasting the surfaces of the blast absorbing material and the metallic material surfaces to improve the bond strength may be resorted to. Such bonded sandwich construction has considerable rigidity which can advantageously be used in or is part of the construction of a vehicle being armoured.

The up-armouring kit may be non-planar and of a shape complemental to a shape of the base, which may, for example, be a belly of a vehicle. The intermediate impact absorbing layer may be formed of smaller pieces of the material forming the layer arranged side by side. The intermediate impact absorbing layer may be formed of laminates which are superimposed to form the intermediate impact absorbing layer of a predetermined thickness.

The up-armouring kit may include mounting formations to mount it in spaced arrangement with the base. The mounting formations may be in the form of a peripheral or part-peripheral border bordering the sandwich construction and lugs projecting from the sandwich construction. The lugs can then be secured to the base such than an air gap is provided between the catch plate and the base.

In accordance with a second aspect of this invention, there is provided an armour wall protecting a protected zone against a self forming fragment type landmine (also known in the field of the invention as a slug type landmine) and comprising a base proximate the zone and an up-armouring kit, in accordance with the first aspect of this invention, mounted in spaced arrangement to the base, the wear plate being most remote from the protected zone.

Thus, an air space or gap is provided between the catch plate and the base. The base may be provided by a wall of a vehicle, water borne vessel, aeroplane, or the like.

The air space or gap is provided to allow the projectile and blast that have deformed the initial sandwich layer, including the blast absorbing material, to expand. The expansion reduces the area specific intensity of energy of the projectile and blast that reduces its penetrating power. With this in mind the blast absorbing layer can be seen as performing not only the function of absorbing energy but also of dispersing energy and the composition of the blast absorbing layer is advantageously adapted to achieve this aim optimally.

The base then provides the final layer of the armour wall thus formed, which is the layer on the protected side. The base is preferably a steel plate of substantial gauge and high ductility with maximum strength preserving the ductility, which is a high toughness preserving the ductility to a degree higher than the outer wear plate which is first exposed to the blast and projectile or slug. Most advantageously, the final layer may be in the form of conventional armour plating. It is found that this last or innermost layer can deform substantially without tearing so that the blast deforming the initial sandwich layer is not admitted to the protected area. For example the plate must deform from a flat condition to a deeply dished condition where the plate is displaced many multiples of the thickness of the plate.

The complete thickness of the total armour wall may be about several hundreds of millimeters, for example. While there is a practical limit to the total thickness in practical applications, the other important requirement is that the composite layer has a limited weight per unit of area. It was found that the composite construction shown herein can achieve the required projectile and blast resistance within constraints of weight to give practical protection for vehicles and other structures.

Another requirement is acceptable levels of cost. It was found that this can be achieved with a composite protective structure of the kind disclosed. For example, the impact absorbing material can be silica—alumina glass or mineral stone that can be relatively inexpensive and lighter than a metal layer of similar thickness.

Thus an advantageous characteristic of armouring in accordance with this invention, is the concept of stepped blast reduction and projectile deceleration and energy dissipation.

Another advantage is construction techniques that are simple to carry out, such as simple casting techniques for the impact absorbing layer, or building the impact absorbing layer up of strips or tiles arranged adjacent each other, or of laminates which are superimposed, and the like. The combined effect of these characteristics is cost effectiveness which is a critical requirement for successful commercial applications.

Figure 2:
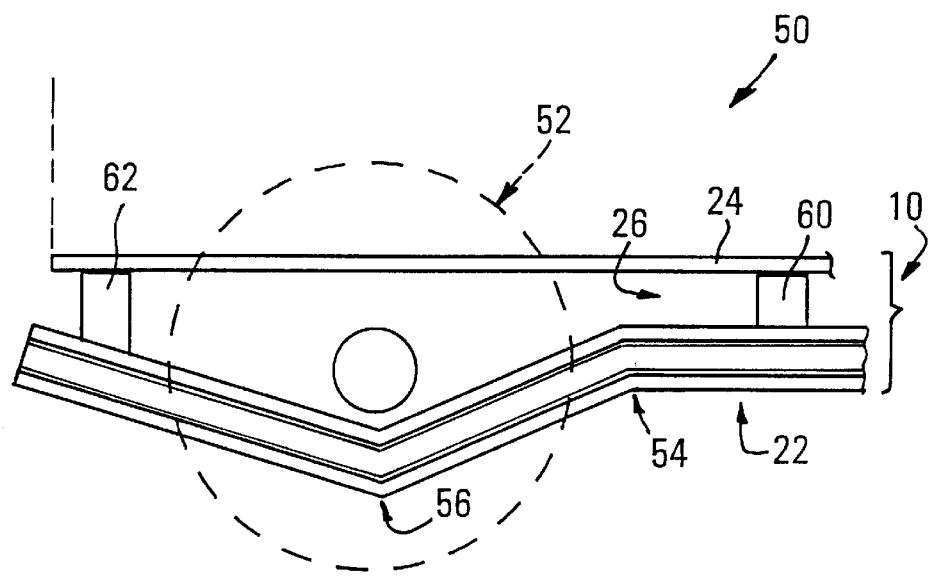
Figure 3:
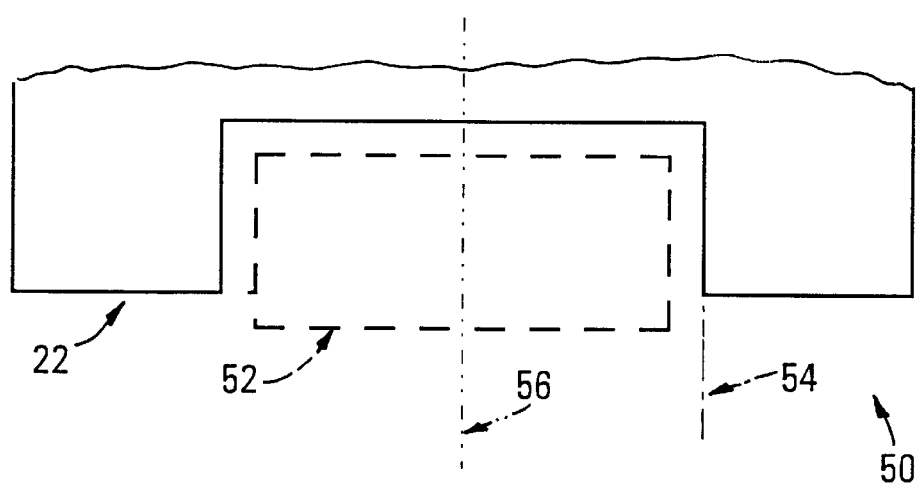

The invention is now more fully described by way of example with reference to the accompanying diagrammatic drawings. In the drawings, FIG. 1 shows, fragmentarily, in cross section, an armour wall in accordance with this invention;

FIG. 2 shows, fragmentarily, in side view, an up-armouring kit in accordance with this invention, applied to a vehicle; and FIG. 3 shows, fragmentarily, the up-armouring kit in bottom plan view.

In FIG. 1 of the drawings, a composite or sandwich structure for protective purposes forming part of an armour wall in accordance with this invention is illustrated in section.

The armour wall, indicated generally at 10, comprises an outer wear plate 12 of steel, which is on that side of the armour wall which is exposed initially to a blast and to a projectile.

Bonded onto an inner surface of the outer wear plate 12 by means of, for example, an epoxy bonding 14, is an impact absorbing material formed into a layer 16, which may, for example, be a laminated glass or ceramic material. Laminations of such glass or ceramic layer may be attached by adhesives of fairly elastic properties that give a beneficial strength to the composite glass or ceramic layer. Each lamination may be in the form of strips, tiles, or the like.

Adjacent the glass or ceramic layer 16 there is provided an inner catch plate 18 bonded to the impact absorbing layer 16, e.g. by means of an epoxy bonding 20.

The outer wear plate 12, inner catch plate 18 and intermediate impact absorbing layer 16, bonded together by the epoxy bonding 14, form a sandwich construction indicated at 22 which is of great rigidity as described above.

An innermost metallic layer 24 is provided spatially on the inside or protected side of the armour wall 10. A gap or spacing, indicated at 26, is formed between the metallic plate layers 18 and 24.

A typical total thickness of the armour wall 10 forming such a composite protective structure is, for example, 350 mm, thus providing for a stepped blast reduction.

It has been found that a projectile or slug from a self forming fragment mine, in the form of a heavily deformed steel plate or disc, originally located on the upper surface of such a mine, which may, for example, acquire almost a tear drop shape, will penetrate the outer wear plate 12. It will then penetrate the impact absorbing layer in which very large amounts of energy are dissipated into its matrix. For example, a laminated glass layer 16 is reduced to powder due to the very high levels of energy but while doing thus, it tends to absorb the slug and the blast of a landmine. Thus, reference numeral 28 indicates an area of initial impact, and dotted lines 30 notionally indicate absorption of energy of the projectile and of the associated blast into the armour wall 10. As the blast and then somewhat dispersed projectile proceed beyond the impact absorbing layer 16, they are then further impeded by the remaining inner catch plate 18 before continuing to expand into the air space 26 as indicated by reference numeral 32. It is to be appreciated that dissipation takes place three dimensionally, even if it is graphically represented only two dimensionally in the drawing.

The energy of the projectile and of the blast, which has already been somewhat reduced, is thus dispersed over the increased area indicated by reference numeral 34. The result of this dispersed projectile and blast impinging on the innermost plate 24 is to cause a very substantial distortion of the plate 24, for example, of the kind as is illustrated notionally by the broken lines 36. Thus it will be appreciated that the properties of the metal of the plates 18 and 24 will be such as to permit such distortion. This finally absorbs the remaining energy of the blast and projectile, preferably without any tearing of the plate 24.

With reference to FIGS. 2 and 3, the armour wall of FIG. 1 is shown to be applied to a vehicle generally indicated by reference numeral 50.

More specifically, the sandwich layer 22 is provided separately in the form of a belly plate. The belly plate 22 is of non-planar shape, more specifically it is bent as indicated by reference numerals 54 and 56 to fit underneath a belly of the vehicle 50 and to shroud a wheel axle of a wheel 52 of the vehicle 50. Furthermore, lugs, for example as indicated by reference numerals 60 and 62, are provided fast with the belly plate 22 to facilitate mounting of the belly plate 22 to the vehicle 50, more specifically to a floor plate of the vehicle 50. The floor plate forms a base or innermost plate 24 in accordance with the invention. The air gap 26 is thus formed between the belly plate 22 and the floor plate 24.

Advantageously, the vehicle 50 may be a conventional armoured vehicle and the floor plate 22 may thus be conventional armour plating.

In the belly plate 22, which is non-planar as mentioned above, and which has a recess at each side to accommodate the wheel 52 as can be seen from FIG. 3, it is advantageous that the impact absorbing layer 16 is built up of smaller pieces of impact absorbing material, which pieces may be formed of strips, tiles or the like. If desired, the impact absorbing layer 16 can also be in the form of laminations to provide the impact absorbing layer 16 of a predetermined thickness.

Where a large or intricately shaped area is to be protected, the sandwich layer may advantageously be formed of more than one component which, preferably, overlap each other. This has a number of advantages, the most important of which is that, in the case of a landmine explosion and destruction of or damaging of the sandwiching layer, generally only one of the portions will be destructed or damaged and only that one portion needs to be replaced. Other, secondary, advantages are ease of manufacture and ease of installing the portions where the whole composite sandwich construction is very large and thus also very heavy.

The Applicant has found in tests that a ceramic material provides a more effective impact absorbing layer than glass. Thus, a ceramic impact absorbing layer can be thinner and lighter than a glass layer of comparable performance. Alternatively, a ceramic layer of the same thickness and weight as those of a glass layer will provide a better performance. However, if thickness or weight is not a factor or not an important factor, a glass layer can be provided at lower cost than a ceramic layer of comparable performance.

It is an important advantage of this invention that armouring is provided which is effective against self forming fragment landmines and which has thickness and weight characteristics which are very advantageous compared to the thickness and weight of conventional armour which would be required to be effective against a self forming fragment landmine.

It is further an advantage that an up-armouring kit is provided which can be used to upgrade a conventional armoured vehicle to make it usable in areas infested with self forming fragment landmines.

I claim:

1. Up-armouring kit suitable for use in protecting a protected zone behind a base against the effects of a self forming fragment type landmine, that is against a projectile of high mass formed by a portion of a shell of the landmine and travelling at high speed, and against a large blast due to explosives, the up-armouring kit comprising an outer wear plate in the form of armour plating of solid construction and of a composition and thickness suitable to prevent penetration by small arm bullets including light machine gun bullets;

an inner catch plate of a material having a ductility higher than a ductility of the outer wear plate, which ductility of said inner catch plate is at least about 8%;

an intermediate impact absorbing layer of a material selected from the group consisting of a ceramic material, a refractory material, a glass based material and glass; the wear plate, the impact absorbing layer and the catch plate being bonded together in said order to form a sandwich construction.

2. Up-armouring kit as claimed in claim 1, which includes mounting means to mount said up-armouring kit in spaced arrangement with the base, the mounting means including a peripheral or part-peripheral border bordering the sandwich construction and lugs protecting from the sandwich construction.

3. Up-armouring kit as claimed in claim 2 which is non-planar and includes at least one bend to accommodate a projection of the base.

4. An armour wall protecting a protected zone against the effects of a self forming fragment type landmine that is against a projectile of high mass formed by a portion of a shell of the landmine and travelling at high speed, and against a large blast due to explosives, said armour wall comprising a base proximate the zone and an up-armouring kit as claimed in claim 2 mounted by means of said mounting means in spaced arrangement to the base, the wear plate being most remote from the protected zone.

5. An armour wall as claimed in claim 4 in which the base is provided by a wall selected from a wall of a vehicle, a wall of a water borne vessel and a wall of an aeroplane.

6. An armour wall as claimed in claim 5 in which the base is in the form of armour plating.

7. A combination of a conveyance selected from the group consisting of a vehicle, a water borne vessel and an aeroplane, the conveyance having an outer wall, and an up-armouring kit as claimed in claim 2, in which said outer wall of the conveyance provides said base, in which the interior of the conveyance in said zone is to be protected, and in which the up-armouring kit is mounted by said mounting means in spaced arrangement to the base, the wear plate being most remote from the protected zone.

8. A combination as claimed in claim 7 in which the base is in the form of armour plating.

9. A combination as claimed in claim 7 in which the conveyance is in the form of a vehicle and in which the up-armouring kit is in the form of a belly plate for the vehicle.

10. A combination as claimed in claim 9 in which the belly plate is non-planar and includes at least one outwardly or downwardly bent portion to cover an axle of a wheel of the vehicle.

11. A combination as claimed in claim 9 in which the belly plate is a composite plate comprising a plurality of separate belly plate portions mounted such that adjacent edges of the belly plate portions overlap.

12. A method of upgrading a vehicle to withstand the effects of a self forming fragment type landmine that is against a projectile of high mass formed by a portion of a shell of the landmine and travelling at high speed, and against a large blast due to explosives, in which an up-armouring kit as claimed in claim 2 is mounted as a belly plate in spaced relationship underneath the vehicle, the up-armouring kit being mounted by means of the mounting means to a chassis of the vehicle.

* * * * *